United States Patent
Sandler (10) Patent No.: US 10,000,950 B2
(45) Date of Patent: Jun. 19, 2018

(54) LATCH ASSEMBLY AND TAILGATE FOR VEHICLE

(71) Applicant: Buyers Products Company, Mentor, OH (US)

(72) Inventor: Philip Sandler, Mayfield Village, OH (US)

(73) Assignee: Buyers Products Company, Mentor, OH (US)

( * ) Notice: Subject to any disclaimer, the term of this patent is extended or adjusted under 35 U.S.C. 154(b) by 0 days. days.

(21) Appl. No.: 15/268,767

(22) Filed: Sep. 19, 2016

(65) Prior Publication Data
US 2018/0080265 A1    Mar. 22, 2018

(51) Int. Cl.
| | |
|---|---|
| B62D 33/027 | (2006.01) |
| B62D 33/037 | (2006.01) |
| E05B 81/02 | (2014.01) |
| E05B 83/16 | (2014.01) |
| E05B 85/26 | (2014.01) |
| E05B 81/10 | (2014.01) |

(52) U.S. Cl.
CPC .......... *E05B 83/16* (2013.01); *B62D 33/0273* (2013.01); *E05B 81/10* (2013.01); *E05B 85/26* (2013.01)

(58) Field of Classification Search
CPC ... B62D 33/0273; B62D 33/037; E05B 81/10; E05B 83/16; E05B 85/26
See application file for complete search history.

(56) References Cited

U.S. PATENT DOCUMENTS

| | | | |
|---|---|---|---|
| 2,360,524 A | 10/1944 | Simpson | |
| 2,785,914 A | 3/1957 | Thomas et al. | |
| 2,955,863 A | 10/1960 | Olender | |
| 3,305,263 A * | 2/1967 | Appleman | B62D 33/0273 296/56 |
| 3,628,817 A | 12/1971 | Sheahan et al. | |
| 3,757,969 A | 11/1973 | Smith | |
| 3,985,380 A | 10/1976 | Raivio | |
| 4,025,094 A | 5/1977 | Mitchell | |
| 4,184,705 A | 1/1980 | Little | |
| 4,307,541 A * | 12/1981 | Farmer | B62D 33/037 296/56 |
| 4,665,649 A * | 5/1987 | Hund, Jr. | B65F 3/00 298/23 S |
| 4,687,237 A | 8/1987 | Bisbing | |

(Continued)

FOREIGN PATENT DOCUMENTS

DE      3923695    * 10/1990  ............ E05B 81/10

*Primary Examiner* — Gregory A Blankenship
(74) *Attorney, Agent, or Firm* — Renner, Otto, Boisselle & Sklar, LLP (57) ABSTRACT

A tailgate assembly includes a talegate and latch assembly. The tailgate is moveable between open and closed positions. The latch assembly includes an actuator, a latch, and a stopper. The actuator is operative to move the latch between an unlatched position where the latch allows movement of the tailgate from the closed position, and a latched position where the latch prevents movement of the tailgate from the closed position. The stopper is responsive to movement in the actuator to move between a nonstopping position and a stopping position. In the stopping position, the stopper prevents the latch from moving from the latched position to the unlatched position other than by the actuator.

20 Claims, 6 Drawing Sheets

(56) References Cited

U.S. PATENT DOCUMENTS

| | | | |
|---|---|---|---|
| 4,801,165 A | 1/1989 | Pyle | |
| 4,893,849 A | 1/1990 | Schlack | |
| 5,624,142 A | 4/1997 | Watson et al. | |
| 5,816,766 A * | 10/1998 | Clark | B60P 1/26 298/23 M |
| 6,345,846 B1 | 2/2002 | DeRees et al. | |
| 7,226,110 B2 | 6/2007 | Doncov et al. | |
| 8,414,083 B2 * | 4/2013 | Dunker | B60P 1/26 296/56 |
| 2017/0089112 A1 * | 3/2017 | Rosales | B62D 33/037 |
| 2017/0166265 A1 * | 6/2017 | Estrada | B62D 33/037 |

* cited by examiner

LATCH ASSEMBLY AND TAILGATE FOR VEHICLE

FIELD OF INVENTION

The present invention relates generally to a latch assembly, and more particularly to a latch assembly for the tailgate of a vehicle.

BACKGROUND

Latch assemblies are used in a variety of applications to latch a moving component such as a tailgate, door, or panel, in a closed position relative to for example the body of a vehicle such as the bed of a truck. The latch prevents the component from disengaging from the vehicle body. Some existing latch assemblies have various shortcomings, drawbacks, and disadvantages relative to certain applications. For example, the latch in some tailgate applications may require additional hardware such as a locking pin to secure the latch assembly in its engaged position. Accordingly, there remains a need for further contributions in this area of technology.

SUMMARY OF INVENTION

The present invention is directed to a latch assembly that latches a tailgate into a closed position and self-locks to maintain the latch in its latched state. According to one aspect of the invention, a tailgate assembly includes a tailgate moveable between open and closed positions; and a latch assembly including an actuator, a latch, and a stopper. The actuator is operative to move the latch between an unlatched position where the latch allows movement of the tailgate from the closed position, and a latched position where the latch prevents movement of the tailgate from the closed position. The stopper is responsive to movement in the actuator to move between a nonstopping position and a stopping position. In the stopping position, the stopper prevents the latch from moving from the latched position to the unlatched position other than by the actuator.

Embodiments of the invention may include one or more of the following additional features separately or in combination.

The latch assembly may include an overcenter linkage, wherein the nonstopping position and stopping position of the stopper are a non-overcenter position and an overcenter position respectively.

The stopper may couple the actuator to the latch. The actuator may be operative to move the stopper between the stopping position and the nonstopping position to respectively move the latch between the latched position and the unlatched position.

The stopper may have first and second ends pivotably connected to the latch and the actuator via respective first and second moving pivots.

The first and second moving pivots may move along respective first and second arc shape paths.

The actuator may have a fail safe mode in which the actuator is configured upon loss of an actuation force to move the latch to the latched position.

The actuator may include a linear actuator.

The tailgate assembly may further include a striker that cooperates with the latch in permitting or preventing movement of the tailgate from the closed position to the open position. In the unlatched position the latch permits movement of the striker relative to the latch to allow movement of the tailgate from the closed position. In the latched position the latch prevents movement of the striker relative to the latch to prevent movement of the tailgate from the closed position.

The striker may be fixed to the tailgate.

The tailgate assembly may be used in combination with a truck bed. The tailgate may be mounted to the truck bed for hinged movement between the open and closed positions relative to an opening in a rear end wall of the truck bed.

The latch may be pivotably mounted to a bracket of the rear end wall for pivotable movement between the unlatched position and the latched position.

The latch may have a moving pivot disposed forward of the rear end wall, and the actuator may be coupled to the moving pivot to move the latch between the latched position and the unlatched position.

The latch may have a hook portion that is disposed aft of the rear end wall.

According to another aspect of the invention, a latch assembly includes a latch that is movable between an open latch position for permitting movement of a striker relative to the latch and a closed latch position for capturing the striker to prevent movement of the striker relative to the latch; and an overcenter linkage including a link having first and second moveable ends, the first end being coupled to the latch and the second end being moveable between a non-overcenter position which causes the first end of the link to move the latch to the open latch position and an overcenter position which causes the first end of the link to move the latch to the closed latch position. When the second end of the link is in the overcenter position the link serves as a stopper to prevent movement of the latch from the closed latch position other than by a motive force applied to the second end of the link.

Embodiments of the invention may include one or more of the following additional features separately or in combination.

The second end of the link may be coupled to a motion imparting member that moves the second end of the link between the non-overcenter position and the overcenter position.

The motion imparting member may be configured to move the second end of the link along a path. Along a first part of the path the second end of the link may be in the non-overcenter position and cause the first end of the link to move the latch to the open latch position. Along a second part of the path the second end of the link may be in the overcenter position and cause the first end of the link to move the latch to the closed latch position.

The latch assembly may further include a frame member having an inlet sized for seating of the second end of the link. When the second end of the link is in the overcenter position the link may abut a wall of the inlet in preventing movement of the latch from the closed latch position to the open latch position.

The latch assembly may further include a frame member. The latch may be pivotably mounted to the frame member via a first fixed pivot, and the first end of the link may be coupled to the latch via a first moving pivot. The first part of the path may be further from the first fixed pivot than the second part of the path.

One end of the motion imparting member may be pivotably mounted to the frame member via a second fixed pivot and an opposite end of the motion imparting member may be pivotably mounted to the second end of the link via a second moving pivot. The mounting bracket, the motion imparting member, the link, and the latch may form a four bar linkage.

The second end of the link may be configured to move from the non-overcenter position to the overcenter position as the second moving pivot approaches the frame member and crosses a line defined by the second fixed pivot, the second moving pivot, and the first moving pivot.

The latch assembly may further include a frame member. The motion imparting member may include a bell crank that is pivotably coupled to the frame member to pivotably move the second end of the link between the non-overcenter position and the overcenter position.

The foregoing and other features of the invention are hereinafter described in greater detail with reference to the accompanying drawings.

BRIEF DESCRIPTION OF THE DRAWINGS

The annexed drawings, which are not necessarily to scale, show various aspects of the invention.

DETAILED DESCRIPTION

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

Figure 1:
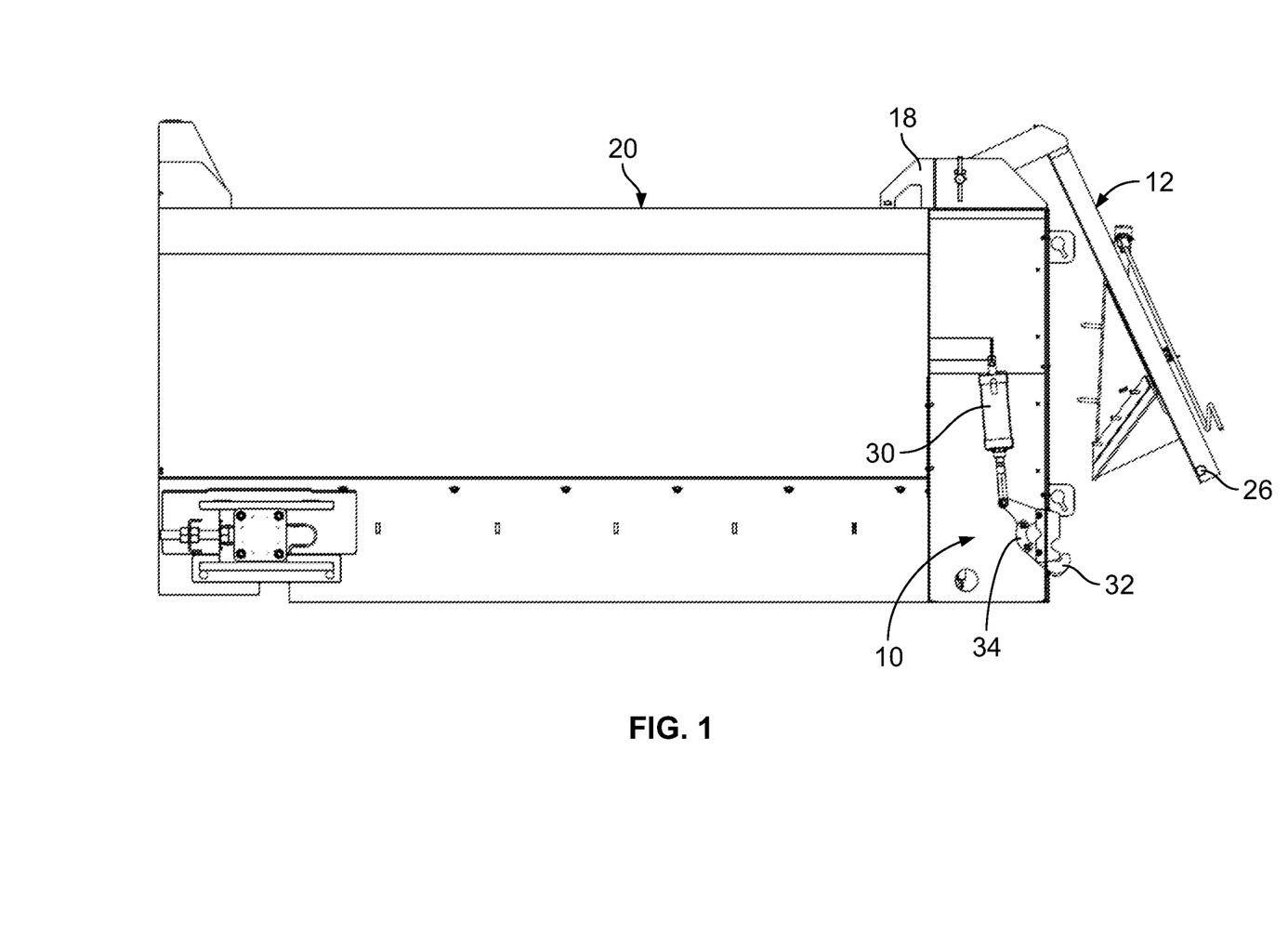
FIG. 1 is a side elevation view of a latch assembly and a tailgate hinged to a truck bed insert according to the invention, showing the latch assembly and tailgate in an open position.
Figure 2:
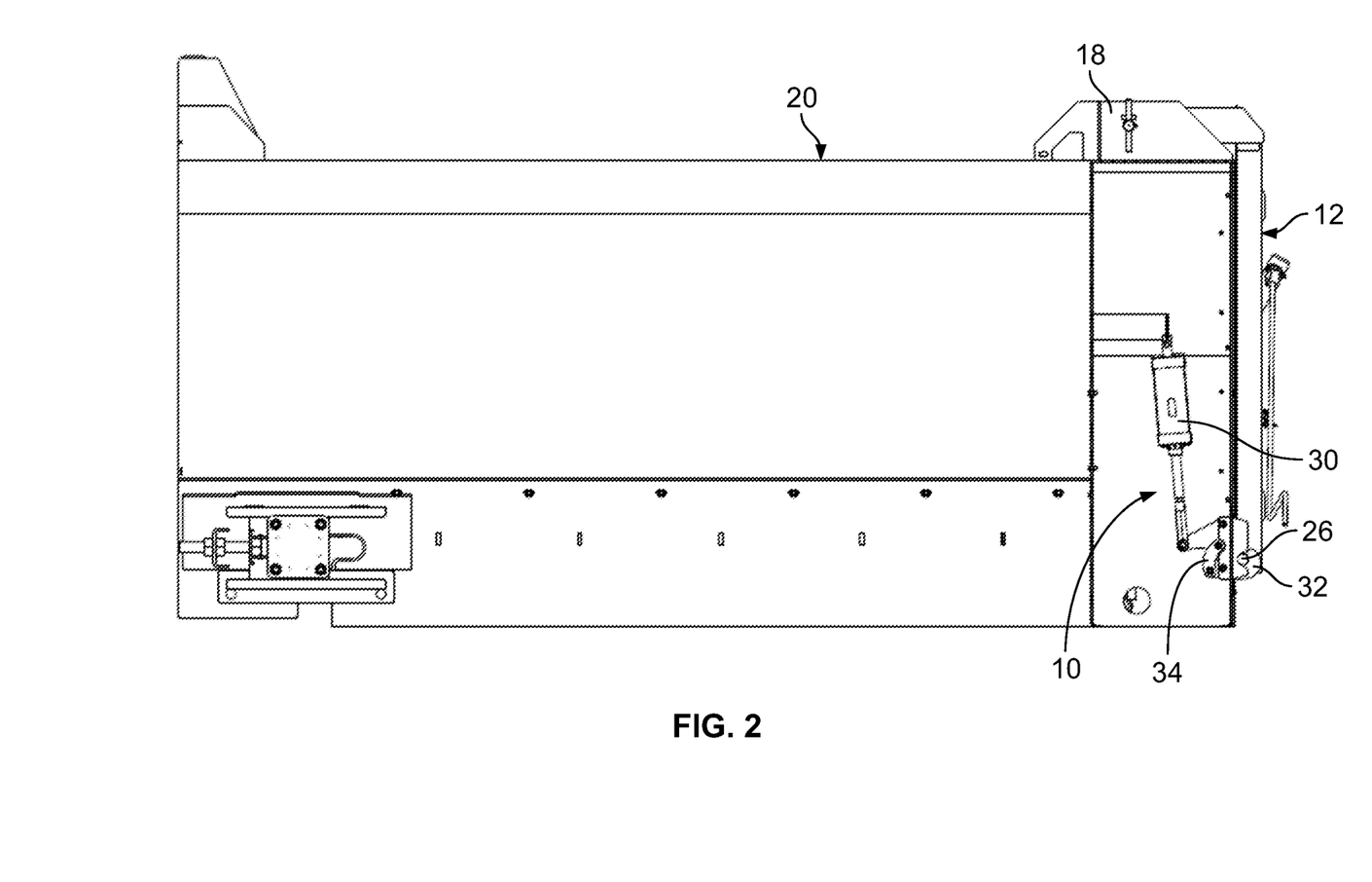
FIG. 2 shows the FIG. 1 latch assembly and tailgate in a closed position.
Figure 3:
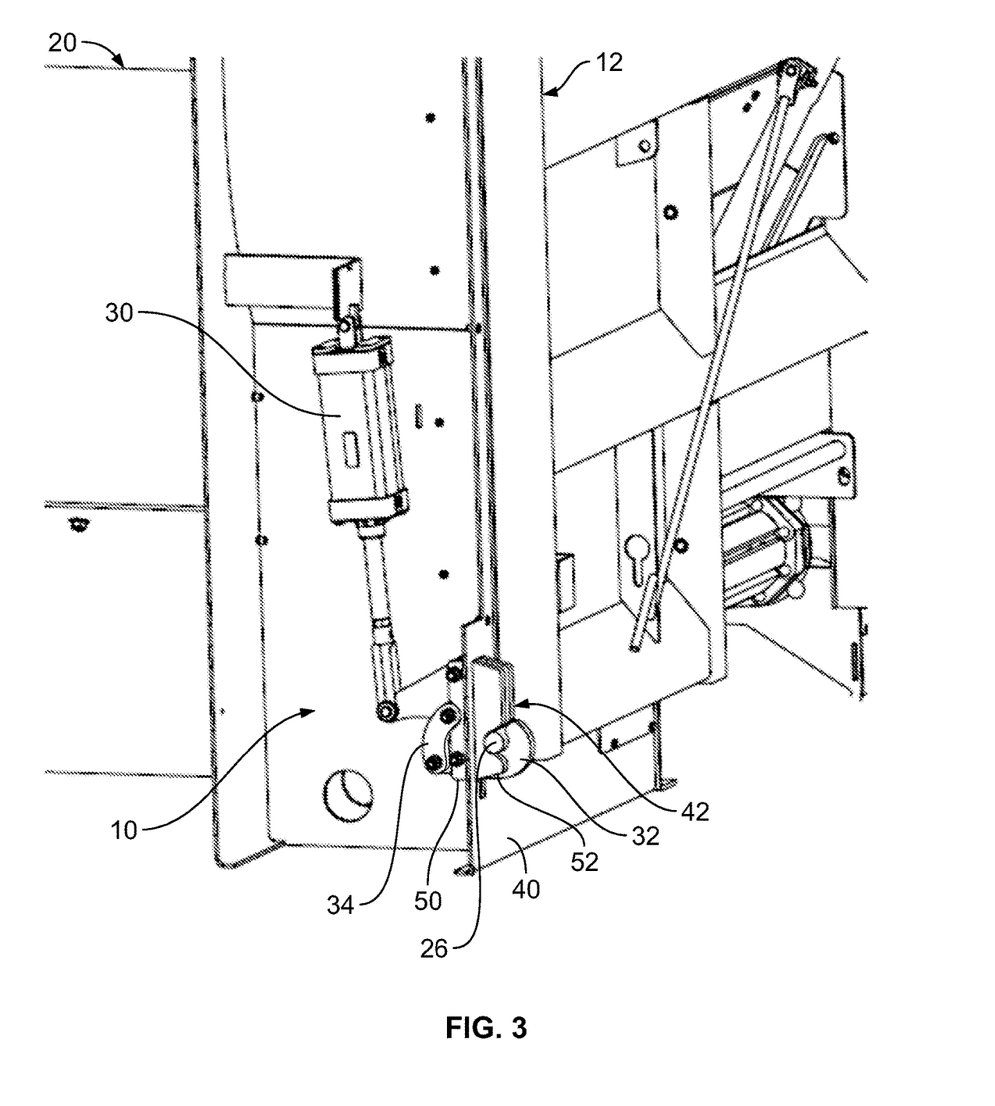
FIG. 3 is a perspective of the FIG. 1 latch assembly and tailgate, showing the latch assembly and tailgate in the closed position.

Turning now to FIGS. 1 and 2, an exemplary latch assembly 10 and tailgate 12 are shown. The tailgate 12 is mounted to an upper structure 18 at the rear of a truck bed 20 for hinged movement between an open position and a closed position to respectively open and block off an opening in the rear of the truck bed 20. A striker 26, best shown in FIG. 1, may be provided to facilitate interaction with the latch assembly 10. The latch assembly 10 includes an actuator 30, a latch 32, and a stopper 34. The actuator 30 is operable to move the latch 32 between an unlatched position as shown in FIG. 1 and a latched position as shown in FIG. 2. In the unlatched position, the latch 32 permits movement of the striker 26 relative to the latch 32 to allow movement of the tailgate 12 from the closed position. In the latch position, the latch 32 prevents movement of the striker 26 relative to the latch 32 to prevent movement of the tailgate 12 from the closed position. The stopper 34, in turn, is responsive to movement in the actuator 30 to move between a nonstopping position and a stopping position shown respectively in FIGS. 1 and 2. As described in greater detail below, in the stopping position, the stopper 34 prevents the latch 32 from moving from the latched position to the unlatched position other than by the actuator 30, thus maintaining the latch assembly 10 in an engaged position. In this regard, the latch assembly 10 is self-locking since the stopper 34 is a component of the latch assembly 10 and no additional hardware is necessary to secure the latch assembly 10 in its engaged position.

As will be appreciated, the latch assembly 10 is not limited to the particular configuration and application shown in FIGS. 1 and 2, and other embodiments are contemplated. For example, there may be a latch assembly 10 and striker 26 at both sides of the vehicle rather than only at the left side as shown. Further, while the latch assembly 10 is shown mounted to the truck bed 20 and the striker 26 is shown fixed to the tailgate 12, an alternative configuration may have the latch assembly 10 mounted to the tailgate 12 and the striker 26 fixed to the truck bed 20. The latch assembly 10 and striker 26 may be utilized in any suitable configuration, and any number of latch assemblies 10 and strikers 26 may be used. Further, the latch assembly 10 may be used in conjunction with components other than the tailgate of a truck bed. For example, the latch assembly 10 could be used to latch a panel, wall, door or similar structure relative to another portion of a vehicle such as the passenger compartment or engine compartment. The latch assembly 10 may also be used with any type of vehicle, including automobiles, aircraft, or watercraft.

Figure 4:
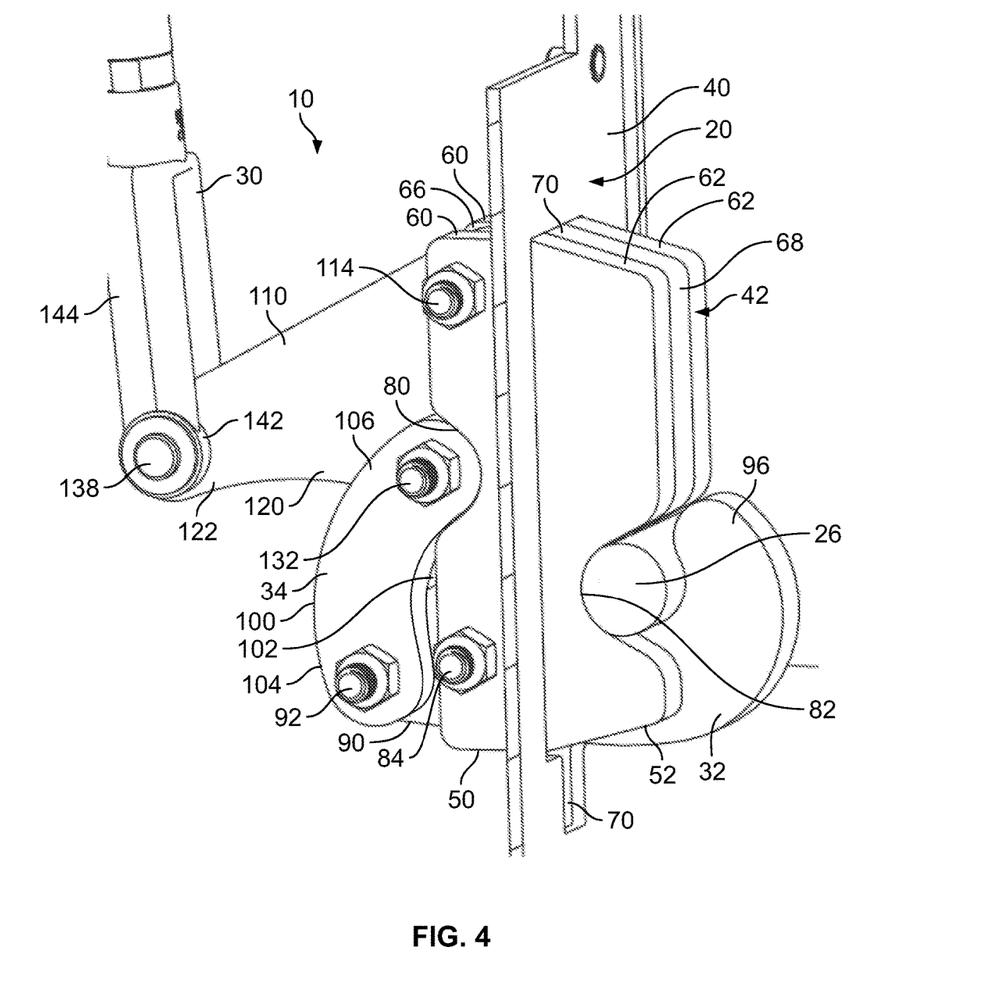
FIG. 4 is an enlarged perspective view of the FIG. 1 latch assembly and tailgate.

Referring now to FIGS. 3-6, the latch assembly 10 includes a frame member 42 integrated into a rear end wall 40 of the truck bed 20. The frame member 42 may be attached to the rear end wall 40 for example by welding or other suitable means. The frame member 42 has a forward frame 50 that projects forwardly from the rear end wall 40 and a rearward frame 52 that projects rearwardly from the rear end wall 40. As best shown in FIG. 4, each of the forward and rearward frames 50, 52 is made up of a pair of parallel panels 60, 62 that define a respective slot 66, 68 therebetween. The spacing apart of the panels 60, 62 may be facilitated or assisted by suitable spacers or the like. A slot 70 in the rear end wall 40 bridges the slots 66, 68 so as to form a coextensive slot extending from the front to the rear of the frame member 42. The forward frame 50 has an inlet 80 that extends transverse to the parallel panels 60 and the slot 66 of the forward frame 50. The rearward frame 52 has an inlet 82 that extends transverse to the parallel panels 62 and the slot 68 of the rearward frame 52. The inlet 80 is located at approximately the vertical center of the forward frame 50 and the inlet 82 is located at approximately the lower third of the rearward frame 52.

The latch 32 of the latch assembly 10 is pivotably mounted via a fixed pivot 84 near the bottom end of the forward frame 50. The fixed pivot 84 may be in the form of a threaded shoulder bolt. The width of the latch 32 is sized slightly less than the width of the coextensive slot formed by the slots 66, 68, 70. As will be appreciated, this facilitates slidable movement of the latch 32 within the coextensive slot as the latch 32 is pivoted about the fixed pivot 84. A fore end 90 of the latch 32 has a free or moving pivot 92 and the opposite or aft end 96 of the latch 32 is in the form of a hook 96. The moving pivot 92 also may be in the form of a threaded shoulder bolt. As best shown in FIGS. 2-4 and 6, where the latch 32 is shown in the latched position, the hook 86 and the inlet 82 have inner curvatures that conform to that of the radius of the striker 26, which, in the illustrated embodiment, is a round pin. As will be appreciated, when the latch 32 is in the latched position the hook 86 of the latch 32, in cooperation with the inlet 82, captures and engages the striker 26. In so doing, the latch 32 thereby secures the tailgate 12 in the closed position.

The stopper 34 of the latch assembly 10 is in the form of a link and, as best shown in FIG. 4, is made up of a pair of parallel plates 100 (only the left one of which is shown in the figures) spaced apart to form a slot 102 therebetween that is approximately the same width as the slots 66, 68 of the forward and rearward frames 50, 52. The spacing apart of the plates 100 may be facilitated or assisted by suitable spacers or the like. The stopper 34 has a first or lower end 104 and a second opposite or upper end 106. The lower end 104 is coupled via the lower moving pivot 92 to the fore end 90 of the latch 32 to enable relative pivotable movement therebetween. As will be appreciated, the slot 102 facilitates slidable movement of the fore end 90 of the latch 32 within the slot 102 during such relative pivotable movement.

The illustrative latch assembly 10 also includes a bell crank 110. The bell crank 110 has a fixed pivot 114, a first leg 120, and a second leg 122. The fixed pivot 114 is near the top end of the forward frame 50. The first leg 120 is coupled via an upper moving pivot 132 to the upper end 106 of the stopper 34 to enable relative pivotable movement therebetween. The second leg 122 is coupled via an actuator moving pivot 138 to an end 142 of a rod 144 of the actuator 30 to enable relative pivotable movement between the second leg 122 and the actuator 30. The fixed pivot 114 and the actuator moving pivot 138 can be in the form threaded shoulder bolts. The width of the bell crank 110 is sized slightly less than the width of the slot 102 in the stopper 34 and the width of the slot 66 in the forward frame 50. As will be appreciated, this facilitates slidable movement of the bell crank 122 within the slots 102, 66 as the bell crank 122 is pivoted about the fixed pivot 128. Owing to the function of the bell crank 110, as the rod 144 of the actuator 30 exerts a downward force on the second leg 122 of the bell crank 110, the first leg 120 of the bell crank 110 exerts a rightward force on the upper end 106 of the stopper 34. The rightward force on the upper end 106 of the stopper 34 urges the upper end 106 into the inlet 80 of the forward frame 50, thus positioning the stopper 34 into its stopping position. As best shown in FIGS. 2-4 and 6, the inlet 80 of the forward frame 50 has an inner curvature that conforms to that of the radius of the upper end 106 of the stopper 34 so that, when the stopper 34 is in the stopping position, the upper end 106 firmly seats within the inlet 80.

Figure 5:
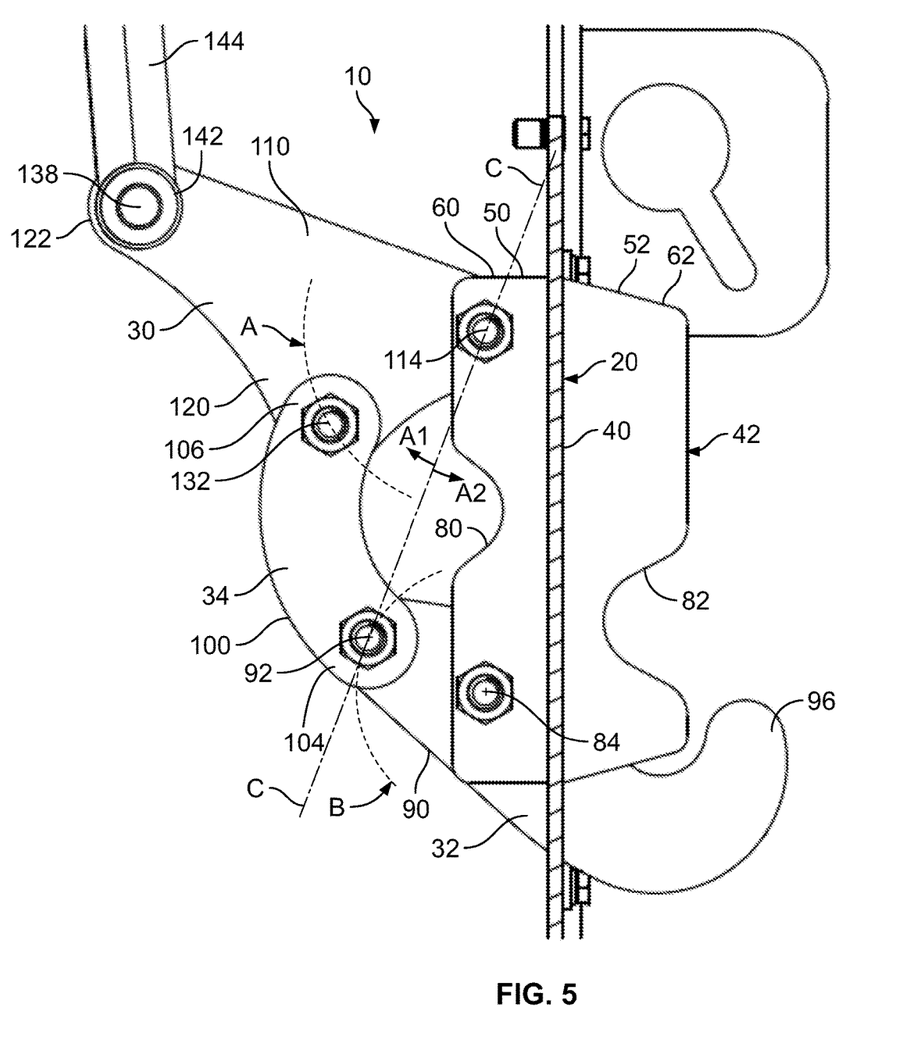
FIG. 5 is an enlarged side elevation view of the FIG. 1 latch assembly, showing the latch assembly in the open position.
Figure 6:
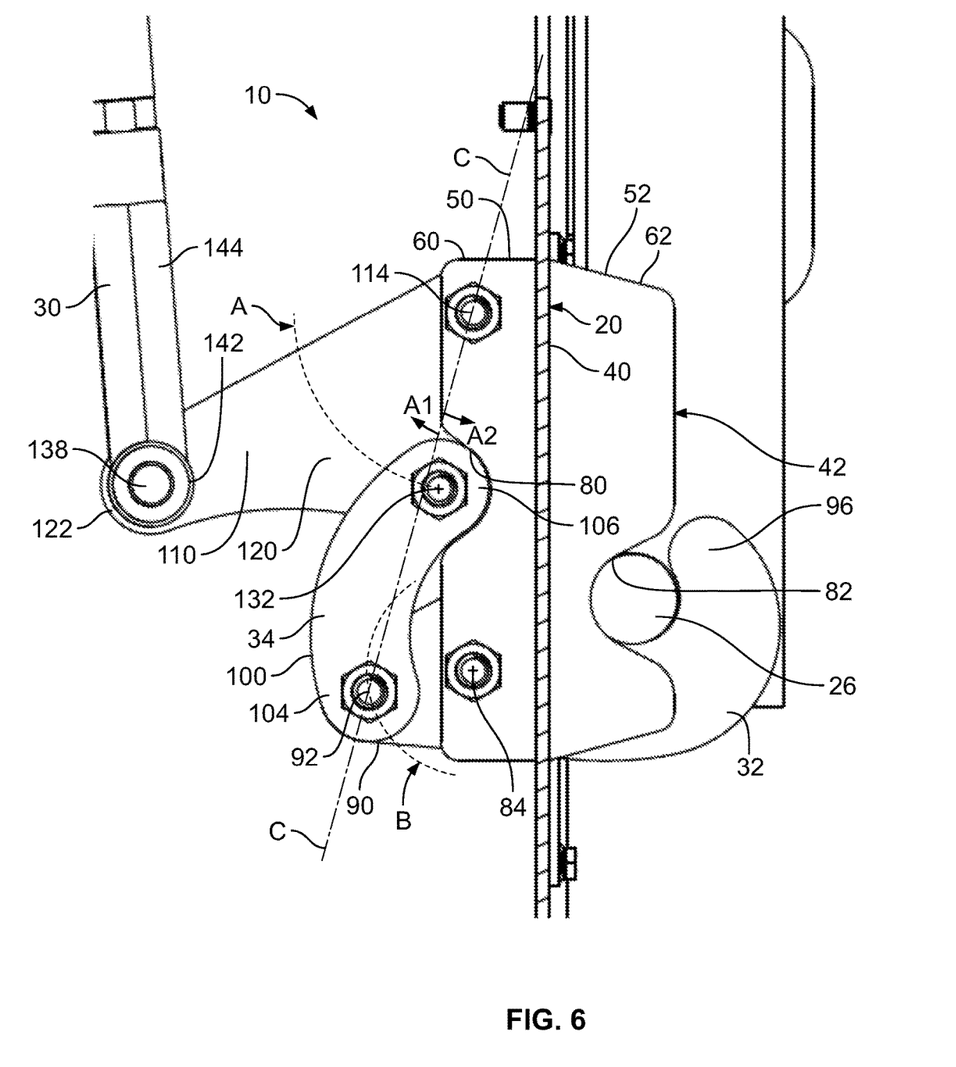
FIG. 6 is an enlarged side elevation view of the FIG. 1 latch assembly, showing the latch assembly and tailgate in a closed position.

Referring now more closely to FIGS. 5 and 6, it will be seen that the latch assembly 10 may be configured to include an overcenter linkage for example as formed by the frame member 42, the latch 32, the stopper 34, and the first leg 120 of the bell crank 110. As shown in FIGS. 5 and 6, a center line C passes through the fixed pivot 114 and the moving pivot 92. As the first leg 120 of the bell crank 110 moves the upper end 106 of the stopper 34 rightward, the moving pivot 132 coupling the first leg 120 to the upper end 106 pivots about the upper fixed pivot 114 of the frame member 42 along a movement locus A. As the lower end 104 of the stopper 34 moves the fore end 90 of the latch 32 downward, the moving pivot 92 coupling the lower end 104 to the fore end 90 pivots about the lower fixed pivot 84 of the frame member 42 along a movement locus B. As the moving pivot 92 is pivoted about the fixed pivot 84, the center line C pivots about the fixed pivot 114. As will be appreciated, as the moving pivot 132 is moved rightward and reaches the pivoting center line C, the fixed pivot 114, the moving pivot 132, and the moving pivot 92 align on the center line C. As the moving pivot 132 is moved to the right of the center line C, the corresponding upper end 106 of the stopper 34 is over the center line C and thus in an overcenter position. When the moving pivot 132 is moved to the left of the center line C, the corresponding upper end 106 of the stopper 34 is no longer over the center line C and thus is in a non-overcenter position.

As mentioned above, the stopper 34 is in the form of a link having lower and upper moveable ends 104, 106. The lower end 104 can be coupled to the latch 32. The upper end 106 can be coupled to a motion imparting member such as the above described actuator 30 and bell crank 110 for movement between the non-overcenter position and the overcenter position. Moving the upper end 106 of the stopper 34 to the non-overcenter position causes the lower end 104 of the stopper 34 to move the latch 32 to an open latch position as shown in FIG. 5. Moving the upper end 106 of the stopper 34 to the overcenter position causes the lower end 104 of the stopper 34 to move the latch 32 to the closed latch position as shown in FIG. 6. When the upper end 106 of the stopper 34 is in the overcenter position, the stopper 34, as its name suggests, serves to stop or prevent movement of the latch 32 from the closed latch position other than by a motive force applied to the upper end 106 of the stopper 34. The latch assembly 10 is thus self-locking since the latch assembly 10 itself, that is the stopper 34 thereof, secures the latch assembly 10 in its latched position.

As will be appreciated, any tendency of the latch 32 to move toward the unlatched position, other than by retraction by a motive force, is effectively resisted by the overcenter position of the stopper 34. Thus, if vibration of the truck bed 20 should tend to move the latch 32 to the unlatched position, the motion would be transmitted through the stopper 34, thus tending to urge the moving pivot 132 coupling the stopper 34 to the bell crank 110 still further in the inlet 80 of the frame member 42, that is, counterclockwise about the fixed pivot 114 in FIG. 6. The moving pivot 132 cannot move further counterclockwise about the fixed pivot 114 though, because the upper end 106 of the stopper 34 is in abutting relation with the wall of the inlet 80.

In the illustrative embodiment, the latch assembly 10 is also configured to guide movement of the latch 32 between the latched position and the unlatched position. As mentioned above, a motion imparting member moves the upper end 106 of the stopper 34 along the movement locus A. As shown in FIGS. 5 and 6, the movement locus A is divided by the center line C between a first part A1 and a second part A2. Along the first part A1 of the movement locus A, the upper end 106 of the stopper 34 is in the non-overcenter position and causes the lower end 104 of the stopper 34 to move the latch 32 to the unlatched position. Along the second part A2 of the movement locus A, the upper end 106 of the stopper 34 is in the overcenter position and causes the lower end 104 of the stopper 34 to move the latch 32 to the latched position. As can be seen in FIGS. 5 and 6, the first part A1 of the movement locus A is further from the lower fixed pivot 84 than the second part A2 of the movement locus A.

In the latch assembly 10 of FIGS. 1-6, the frame member 42, the first leg 120 of the bell crank 110, the stopper 34, and the latch 32 form a four bar linkage. It will be appreciated that the latch assembly 10 need not be limited to such a construction, and other embodiments are contemplated. For example, in an embodiment, the moving pivot 132 may be guided for pivotable movement about the location corresponding to that of the fixed pivot 114 of the frame member 42 by an arc shape slot in an enlarged frame member or other structure of the truck bed. The arc shape slot may define a path such as that of the movement locus A in FIGS. 5 and 6. A suitable motion imparting member can be configured to move the moving pivot 132 to opposite end portions of the slot, which can correspond to for example the positions of the moving pivot 132 shown respectively in FIGS. 5 and 6. The arc shape slot could include at its rightmost position a curvature corresponding in position and size to that of the inlet 80 in the frame member 42. In another embodiment, the moving pivot 92 may be guided for pivotable movement about the location corresponding to that of the fixed pivot 84 of the frame member 42 by an arc shape slot in an enlarged frame member or other structure of the truck bed. The arc shape slot may define a path such as that of the movement locus B in FIGS. 5 and 6. The lower end 104 of the stopper 34 can be configured to move the moving pivot 92 to opposite end portions of the slot, which can correspond to for example the positions of the moving pivot 92 shown respectively in FIGS. 5 and 6.

In an embodiment, the actuator 30 can be configured to have a fail safe mode in which the actuator 30, upon loss of an actuation force, moves the latch 32 to its latched position and consequently the stopper 34 to its overcenter position. In the event of actuator failure, the latch 32 would then remain in the latched position owing to the stopper 34 preventing movement of the latch 32 from the latched position to the unlatched position.

The valve assembly 10 of FIGS. 1-6 incorporates a hydraulically driven linear actuator 30 and a bell crank 110 as a motion imparting member that moves the moving pivot 132. It will be appreciated that the latch assembly 10 may utilize other or additional types of motion imparting members. Thus, the motion imparting member may include for example electric and/or pneumatic type actuators and may include a rotary drive that rotates the fixed pivot 114 to thereby rotate a link corresponding to for example the link 120 of the bell crank 110 about the fixed pivot 114.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A tailgate assembly comprising:
    a tailgate moveable between open and closed positions; and
    a latch assembly including an actuator, a latch, and a stopper;
    wherein the actuator is operative to move the latch between an unlatched position where the latch allows movement of the tailgate from the closed position, and a latched position where the latch prevents movement of the tailgate from the closed position;
    wherein the stopper is responsive to movement in the actuator to move between a nonstopping position and a stopping position, wherein in the stopping position the stopper prevents the latch from moving from the latched position to the unlatched position other than by the actuator;
    wherein the latch assembly includes an overcenter linkage, and the nonstopping position and stopping position of the stopper are a non-overcenter position and an overcenter position respectively.

2. The tailgate assembly of claim 1, wherein the actuator comprises a linear actuator.

3. The tailgate assembly of claim 1, further comprising a striker that cooperates with the latch in permitting or preventing movement of the tailgate from the closed position to the open position, wherein in the unlatched position the latch permits movement of the striker relative to the latch to allow movement of the tailgate from the closed position and in the latched position the latch prevents movement of the striker relative to the latch to prevent movement of the tailgate from the closed position.

4. The tailgate assembly of claim 3, wherein the striker is fixed to the tailgate.

5. The tailgate assembly of claim 1 in combination with a truck bed, the tailgate being mounted to the truck bed for hinged movement between the open and closed positions relative to an opening in a rear end wall of the truck bed.

6. The tailgate assembly of claim 5, wherein the latch is pivotably mounted to a bracket of the rear end wall for pivotable movement between the unlatched position and the latched position.

7. The tailgate assembly of claim 5, wherein the latch has a moving pivot disposed forward of the rear end wall, and wherein the actuator is coupled to the moving pivot to move the latch between the latched position and the unlatched position.

8. The tailgate assembly of claim 5, wherein the latch has a hook portion that is disposed aft of the rear end wall.

9. A tailgate assembly comprising:
    a tailgate moveable between open and closed positions; and
    a latch assembly including an actuator, a latch, and a stopper;
    wherein the actuator is operative to move the latch between an unlatched position where the latch allows movement of the tailgate from the closed position, and a latched position where the latch prevents movement of the tailgate from the closed position;
    wherein the stopper is responsive to movement in the actuator to move between a nonstopping position and a stopping position, wherein in the stopping position the stopper prevents the latch from moving from the latched position to the unlatched position other than by the actuator;
    wherein the stopper couples the actuator to the latch, wherein the actuator is operative to move the stopper between the stopping position and the nonstopping position to respectively move the latch between the latched position and the unlatched position.

10. A tailgate assembly comprising:
    a tailgate moveable between open and closed positions; and
    a latch assembly including an actuator, a latch, and a stopper;

wherein the actuator is operative to move the latch between an unlatched position where the latch allows movement of the tailgate from the closed position, and a latched position where the latch prevents movement of the tailgate from the closed position;

wherein the stopper is responsive to movement in the actuator to move between a nonstopping position and a stopping position, wherein in the stopping position the stopper prevents the latch from moving from the latched position to the unlatched position other than by the actuator;

wherein the stopper has first and second ends pivotably connected to the latch and the actuator via respective first and second moving pivots.

11. The tailgate assembly of claim 10, wherein the first and second moving pivots move along respective first and second arc shape paths.

12. A tailgate assembly comprising:
a tailgate moveable between open and closed positions; and
a latch assembly including an actuator, a latch, and a stopper;
wherein the actuator is operative to move the latch between an unlatched position where the latch allows movement of the tailgate from the closed position, and a latched position where the latch prevents movement of the tailgate from the closed position;
wherein the stopper is responsive to movement in the actuator to move between a nonstopping position and a stopping position, wherein in the stopping position the stopper prevents the latch from moving from the latched position to the unlatched position other than by the actuator;
wherein the actuator has a fail safe mode in which the actuator is configured upon loss of an actuation force to move the latch to the latched position.

13. A latch assembly comprising:
a latch that is movable between an open latch position for permitting movement of a striker relative to the latch and a closed latch position for capturing the striker to prevent movement of the striker relative to the latch; and
an overcenter linkage including a link having first and second moveable ends, the first end being coupled to the latch and the second end being moveable between a non-overcenter position which causes the first end of the link to move the latch to the open latch position and an overcenter position which causes the first end of the link to move the latch to the closed latch position;
wherein when the second end of the link is in the overcenter position the link serves as a stopper to prevent movement of the latch from the closed latch position other than by a motive force applied to the second end of the link.

14. The latch assembly of claim 13, further comprising a frame member having an inlet sized for seating of the second end of the link, and wherein when the second end of the link is in the overcenter position the link abuts a wall of the inlet in preventing movement of the latch from the closed latch position to the open latch position.

15. The latch assembly of claim 13, wherein the second end of the link is coupled to a motion imparting member that moves the second end of the link between the non-overcenter position and the overcenter position.

16. The latch assembly of claim 15, wherein the motion imparting member is configured to move the second end of the link along a path, wherein along a first part of the path the second end of the link is in the non-overcenter position and causes the first end of the link to move the latch to the open latch position, and wherein along a second part of the path the second end of the link is in the overcenter position and causes the first end of the link to move the latch to the closed latch position.

17. The latch assembly of claim 16, further comprising a frame member, wherein the latch is pivotably mounted to the frame member via a first fixed pivot and the first end of the link is coupled to the latch via a first moving pivot, and wherein the first part of the path is further from the first fixed pivot than the second part of the path.

18. The latch assembly of claim 17, wherein one end of the motion imparting member is pivotably mounted to the frame member via a second fixed pivot and an opposite end of the motion imparting member is pivotably mounted to the second end of the link via a second moving pivot, and wherein the mounting bracket, the motion imparting member, the link, and the latch form a four bar linkage.

19. The latch assembly of claim 18, wherein the second end of the link is configured to move from the non-overcenter position to the overcenter position as the second moving pivot approaches the frame member and crosses a line defined by the second fixed pivot, the second moving pivot, and the first moving pivot.

20. The latch assembly of claim 15, further comprising a frame member, wherein the motion imparting member includes a bell crank that is pivotably coupled to the frame member to pivotably move the second end of the link between the non-overcenter position and the overcenter position.

* * * * *